June 20, 1950          L. HABER          2,512,100
MANICURING IMPLEMENT
Filed Sept. 24, 1946
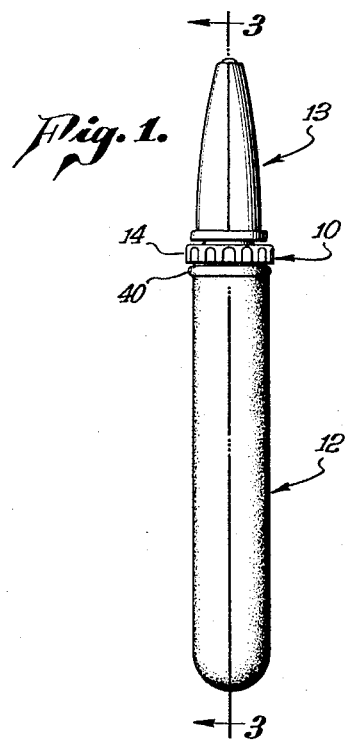
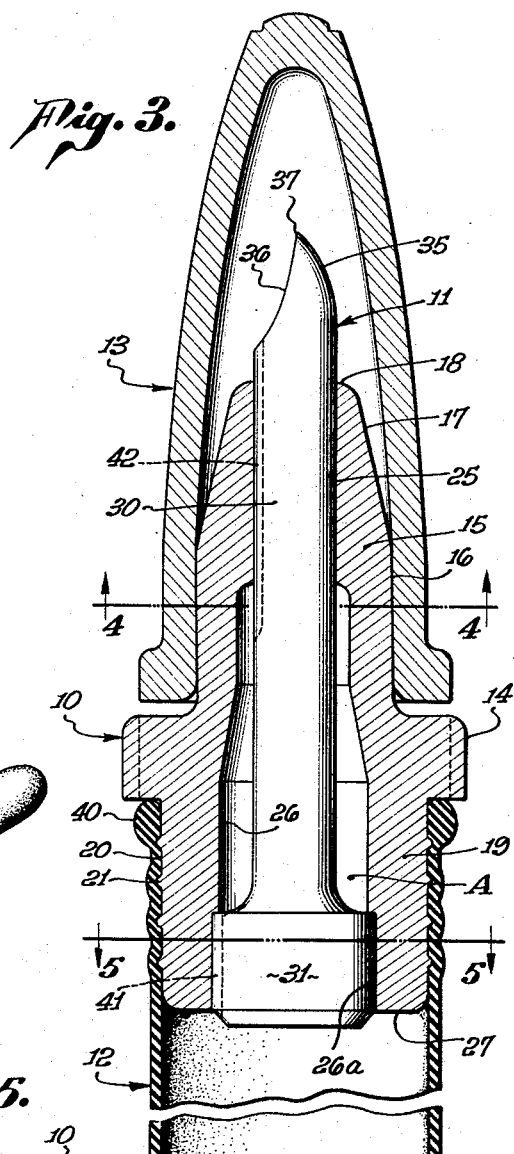
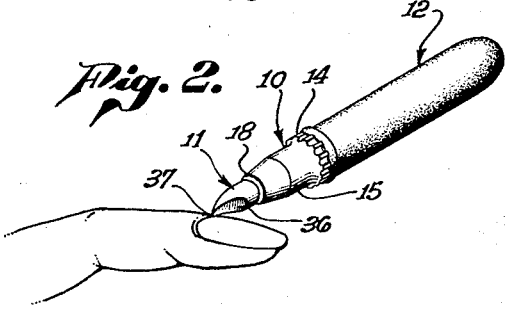
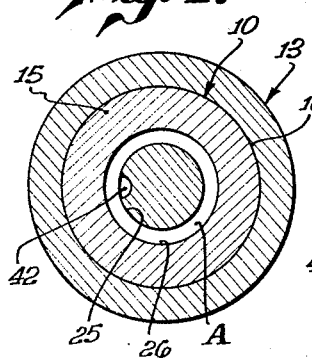
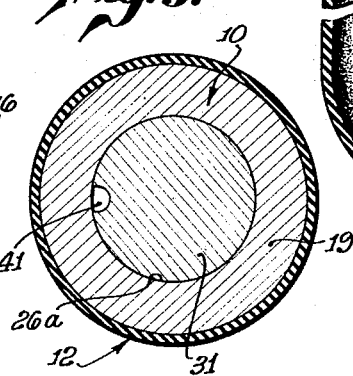
INVENTOR
*Leo Haber*
BY
*N. Chapell*
ATTORNEY Patented June 20, 1950

2,512,100

UNITED STATES PATENT OFFICE 2,512,100

MANICURING IMPLEMENT

Leo Haber, Los Angeles, Calif.

Application September 24, 1946, Serial No. 698,957

7 Claims. (Cl. 132—74.5)

This invention relates to a manicuring an implement and it is more specifically concerned with an implement useful in applying cuticle removing or softening materials and in trimming or dressing cuticles, it being a general object of the invention to provide a simple, effective, and improved device of this general character.

Finger nails as well as toe nails are implanted by portions termed roots, which enter a groove in the skin. The exposed portions or bodies of the nails are convex and terminate in a free outer end. The cuticle as it passes forward on the dorsal surface of the finger or toe is attached to the surface of the nail a little forward or ahead of the root, while at the extremity of the finger or toe it is connected with the under surface of the nail a little behind or rearward of the free end or edge of the nail. The cuticle and nail are both epidermic structures and are directly continuous with each other. However, around the margins of the nail, except at the free edge, the cuticle tends to freely overlie the nail and it is this portion of the cuticle that is popularly known as the cuticle of the nail and which often becomes uneven or unsightly, unless trimmed or removed.

Preparations, usually liquid in form, are employed to soften the cuticle of nails and various implements are used to cut or trim the cuticles, usually after they have been softened. The handling of such preparations or so-called cuticle removers is usually cumbersome and the implements used to trim cuticles are often inefficient and may even be dangerous.

It is a general object of my present invention to provide an implement which serves as an applicator for a cuticle removing or softening material and also as a cutting or trimming implement, by which nail cuticle can be cut or trimmed, as desired.

A further general object of my present invention is to provide an implement of the general character referred to which effectively carries an adequate supply of cuticle remover or softening material so that such material is under control of the user and can be dispensed at will without danger of spilling or wasting.

A further object of the present invention is to provide an implement of the general character referred to having a liquid container that forms a reservoir and which is normally rigid and forms a handle for the implement but which is deflectible in a manner to cause liquid to be dispensed therefrom when required for use.

It is another object of the present invention to provide an implement of the general character referred to involving few simple parts which are related to form a trap which prevents liquid from discharging from the container unless the container is deliberately operated to cause the discharge.

Another object of the invention is to provide an implement of the general character referred to including a trimming device operable to engage a nail cuticle which device is of improved form and construction.

The various objects and features of my invention will be fully understood from the following detailed description of a typical preferred form and application of the invention, throughout which description reference is made to the accompanying drawings, in which:

Fig. 1 is a side elevation of the implement provided by the present invention showing it capped, in which condition it can be readily handled or transported. Fig. 2 is a view showing the implement with the cap removed and illustrating the manner in which the trimmer of the implement is applicable to a nail cuticle to cut or trim it. Fig. 3 is an enlarged longitudinal sectional view of the implement, being a view taken substantially as indicated by line 3—3 on Fig. 1. Fig. 4 is a transverse sectional view taken as indicated by line 4—4 on Fig. 3, and Fig. 5 is a transverse sectional view taken as indicated by line 5—5 on Fig. 3.

The implement provided by the present invention involves, generally, a body 10, a trimmer 11 carried by the body to project forward therefrom, a container 12 carried by the body to project rearwardly therefrom and operable to carry a supply of liquid and to dispense such liquid through the body to the trimmer, and a cap 13 applicable to the body to house or cover the trimmer when the device is not in use.

The body 10 of the implement is an elongate tubular element and in the preferred form of the invention it involves, generally, a central flange-like portion 14 the exterior of which may be knurled or otherwise finished so that it can be readily gripped. The body 10 has a forward end portion 15 having a turned or round seat 16 adjacent the flange portion 14 to receive and carry the cap 13, as clearly illustrated in Fig. 3 of the drawings. The extreme outer end part of the forward end portion 15 is tapered or reduced at 17 as it approaches the tip end 18 of portion 15. The rear end portion 19 of the body 10 is smaller in diameter than the flange portion 14 but somewhat larger than the forward end portion 15 and it has its exterior 20 shaped and finished to receive and hold the container 12. In the form of the invention illustrated the exterior 20 of end portion 19 is round and turned and is provided with a plurality of small retainer ribs 21 which serve to prevent accidental displacement of the container from the body.

A round opening or bore 25 extends into the body from its tip end 18 and at a point intermediate the ends of the body it joins a large bore 26 which extends into the body from its rear end 27. The portion of the bore 26 immediately adjacent the end 27 is preferably counterbored, as at 26ª to receive the head of the trimmer, as will be hereinafter described.

The trimmer 11 involves, generally, an elongate stem or shank 30 snugly fitted in the bore 25 at the outer or forward end portion of the body and continuing rearwardly therefrom to the rear end portion of the body where it carries a head 31 which fits tightly into the counterbore 26ª. The shank or stem 30 of the trimmer is preferably uniform in size or diameter, with the result that it extends through the large bore 26 with clearance so that there is a chamber A formed in the interior of the body around the stem and between the head 31 and the forward end portion of the body in which the bore 25 occurs.

The shank or stem of the trimmer projects forward from the tip end 18 of the body and has a rounded tip portion 35 with a concave cut 36 in it at one side, forming a working edge 37 as clearly illustrated in Figs. 2 and 3 of the drawings. It is to be observed that by forming the edge 37 as I have shown, it is a rather blunt edge and is not a sharp edge likely to penetrate between the cuticle and nail in a manner to cause injury, and furthermore it is not a straight edge, but rather is rounded or curved longitudinally, giving it a shape most effective for working on a nail cuticle. In practice the shank may project any desired distance forward from the tip end 18 of the body 10, it being preferred in practice to proportion the parts so that the edge 37 is far enough forward of the body so that it can be most conveniently manipulated when the body is held through engagement of the container 12 and the flange portion 14.

The container 12 is an elongate tubular element closed at its outer end and having its inner end applied to or engaged over the rear portion 19 of the body. The container fits snugly over the portion 19 of the body, these parts being engaged so that the ribs 21 on the portion 19 serve to effectively retain the container on the body and at the same time establish a seal preventing leakage of liquid between the container and body.

In accordance with my invention the container 12 is formed of a pliable or deformable material such as a plastic or a rubber-like composition which, under normal conditions, is substantially rigid or at least is rigid enough to form an effective handle by which the implement can be manipulated but which can be distorted or collapsed by pressure applied through the fingers of the user. It is desirable to form the container of a transparent material, and in practice I may use any one of numerous molded or otherwise formed plastics which have the desired physical characteristics and which are at the same time inexpensive and easily formed. In the particular case illustrated I provide a reinforcing rib or bead 40 around the open end of the container so that this part of the container is somewhat stiffened or reinforced.

In accordance with my present invention I provide a channel 41 connecting the interior of the container 12 with the chamber A and I provide a discharge duct 42 connecting the chamber A with the projecting tip portion of the trimmer so that liquid may be discharged from the container 12 through the chamber A and to the tip portion of the trimmer. In practice I may form the channel 41 and the duct 42 in any suitable manner. However, I prefer to establish these fluid conductors by providing a longitudinal depression or groove in the exterior of the head 31 to form the channel 41 and by providing a longitudinal groove or channel in the exterior of the stem 30 where it passes through the bore 25 to form the duct 42.

The cap 13 may be a simple closure applicable to the forward end portion 15 of the body to fit over and protect the projecting or tip portion of the trimmer, as clearly illustrated in Fig. 3 of the drawings. I have found it desirable to provide a friction fit between the cap and the seat 16 so that the cap can be readily removed whenever the device is to be used.

In using the implement the container is detached from the body by slipping the open end portion thereof off of the rear end portion 19 of the body and the desired material, say for instance a suitable cuticle softener is filled into the container. The body is then reapplied to the container by inserting the portion 19 of the body into the open end of the container reestablishing a firm liquid-tight seal between the body and container. When the device is to be used the cap 13 is removed and the container deflected or compressed applying pressure to the liquid contained therein so that such liquid is forced through the channel 41 into the chamber A and from there through the duct 42 so that a small amount, such as a drop or two of the liquid, is finally discharged to the tip of the trimmer, so that it can be applied by means of the tip of the trimmer to the cuticle of the nails to be dressed. The chamber A between the channel 41 and the duct 42 forms a trap or check means which prevent the liquid from running out of the device except when the container is depressed. As the device is used air that must enter the container 12 to replace the liquid dispensed therefrom is first held or trapped in the chamber A and finally is admitted through the channel 41 into the container. The chamber and ducts are proportioned to function in any position, that is, right side up, or up side down, and small or accidental pressures on the container will only discharge air from the trap or chamber A. In practice I make the ducts as small as practical so that the trap is most effective.

If the desired amount of nail cuticle softener has been dispensed from the container and applied to the nail cuticles by means of the tip portion of the trimmer the implement can be conveniently manipulated so that the edge 37 serves to trim, clean or otherwise dress the softened nail cuticles. When the operation has been completed the cap 13 can be applied and the device will then remain sealed until again desired for use.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An implement of the character described including, two elements rigidly joined together, one a tubular body and the other an applicator having a stem carried in the body, a tip projecting forward from the body and a head on the stem tight in the body, the body and stem having spaced parts defining a chamber within the body, and a collapsible container carried by the body supplying liquid to the chamber there being fluid conducting channels in the head and in the stem where it is carried by the body, passing fluid from the container to the chamber and from the chamber to the tip.

2. An implement of the character described including two elements rigidly joined together, one an elongate tubular body and the other an applicator having a stem snug in the forward end portion of the body, a tip on the stem forward of the body and a head on the stem within the body, the body and stem having spaced parts between the head and the said forward end portion of the body defining a chamber within the body, and a container carried by the body supplying liquid to the chamber, there being a channel in the head connecting the container and chamber and a duct in the stem conducting liquid from the chamber to the tip.

3. An implement of the character described including, two elements rigidly joined together, one an elongate tubular body with a central opening reduced at the forward end of the body and the other an applicator having a stem occupying said opening, a tip on the stem forward of the body and a head on the stem fitting closely in the body, the body and stem having spaced parts immediately forward of the head defining a chamber within the body, and a container carried by the body supplying liquid to the chamber, there being a channel in the stem connecting the chamber with the tip, there being a groove in the head forming a channel connecting the container and chamber.

4. An implement of the character described including, two elements rigidly joined together, one an elongate tubular body and the other an applicator having a stem closing the forward end of the body, a tip on the stem forward of the body and a head within the body closing the rear end of the body, the body and stem having spaced parts between the head and the closed forward end of the body defining a chamber within the body, and a collapsible container carried by the body and projecting from the rear end thereof and supplying liquid to the chamber, there being a groove in the head forming a channel connecting the container and chamber, there being a groove in the stem forming a duct from the chamber to the tip.

5. An implement of the character described including, two rigid elements rigidly joined together, one an elongate tubular body and the other an applicator having a stem fitting close in the forward end of the body, a tip on the stem forward of the body and a head on the stem in the body, the body and stem having spaced parts defining a chamber within the body, and a collapsible container carried by the body at the rear end thereof supplying liquid to the chamber, the head being fitted tight in the body there being a fluid passing opening in the head communicating with the chamber and a fluid passing opening in the stem from the chamber to the tip.

6. An implement of the character described including, an elongate tubular body having a forward end portion, and a rear end portion, there being a bore in the body at the forward end thereof and a bore in the body at the rear end thereof, a head tight in the bore at the rear end of the body, a stem carried by the head extending forward through the body with substantial clearance forming a chamber within the body and fitting snugly in the bore at the forward end of the body, an applicator on the stem forward of the body, and a container carried by the rear end portion of the body and projecting therefrom forming a handle, there being a fluid conducting channel connecting the container and the chamber, and there being a fluid connecting duct connecting the chamber and the applicator.

7. An implement of the character described including, an elongate tubular body having an external flange portion, a forward end portion, and a rear end portion, there being a bore in the body at the forward end portion thereof and a bore in the body at the rear end portion thereof, a head tight in the bore at the rear end portion of the body, a stem rigid with the head and extending forward therefrom through the body with clearance forming a chamber within the body and fitting snugly in the bore at the forward end portion of the body, the stem forward of the body forming an applicator, and a collapsible container carried by the rear end portion of the body and abutting the flange and projecting rearwardly therefrom forming a handle, there being a channel in the exterior of the head connecting the container and chamber, and there being a duct in the exterior of the stem connecting the chamber and the applicator.

LEO HABER.

REFERENCES CITED

The following references are of record in the file of this patent:

UNITED STATES PATENTS

| Number | Name | Date |
| --- | --- | --- |
| 672,207 | Dunn | Apr. 16, 1901 |
| 1,025,903 | Don Jian | May 7, 1912 |
| 1,362,601 | Chandler | Dec. 21, 1920 |
| 1,636,148 | Provost | July 19, 1927 |
| 2,116,888 | Grodka | May 10, 1938 |
| 2,299,627 | Hunter | Oct. 20, 1942 |
| 2,392,907 | Driscoll | Jan. 15, 1946 |